United States Patent
Law et al.

(10) Patent No.: US 7,010,450 B2
(45) Date of Patent: Mar. 7, 2006

(54) COORDINATION OF FIELD DEVICE OPERATIONS WITH OVERRIDES AND BYPASSES WITHIN A PROCESS CONTROL AND SAFETY SYSTEM

(75) Inventors: Gary Law, Georgetown, TX (US); Michael G. Ott, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 96 days.

(21) Appl. No.: 10/668,013

(22) Filed: Sep. 22, 2003

(65) Prior Publication Data

US 2004/0199364 A1    Oct. 7, 2004

Related U.S. Application Data

(63) Continuation-in-part of application No. 10/404,156, filed on Apr. 1, 2003, now Pat. No. 6,898,542.

(51) Int. Cl.
G06F 19/00  (2006.01)

(52) U.S. Cl. .......................... 702/108; 714/25
(58) Field of Classification Search ................ 702/108, 702/118, 182–185, 188, 189; 714/25, 30, 714/36, 47, 48; 340/501, 506, 514, 531, 340/3.1, 3.43
See application file for complete search history.

(56) References Cited

U.S. PATENT DOCUMENTS

| | | |
|---|---|---|
| 4,427,620 A | 1/1984 | Cook |
| 4,448,033 A | 5/1984 | Briccetti |
| 5,768,119 A | 6/1998 | Havekost et al. |
| 5,970,430 A | 10/1999 | Burns et al. |
| 6,014,612 A | 1/2000 | Larson et al. |
| 6,049,578 A | 4/2000 | Senechal et al. |
| 6,155,282 A | 12/2000 | Zachary et al. |
| 6,186,167 B1 | 2/2001 | Grumstrup et al. |
| 6,292,523 B1 | 9/2001 | Senechal et al. |
| 6,774,786 B1 | 8/2004 | Havekost et al. |
| 2002/0052673 A1 | 5/2002 | Seong et al. |

(Continued)

OTHER PUBLICATIONS

Search Report under Section 17(5) issued in GB 0407443.1 application by the United Kingdom Patent Office on Aug. 4, 2004.

(Continued)

*Primary Examiner*—Edward Raymond
(74) *Attorney, Agent, or Firm*—Marshall, Gerstein & Borun LLP

(57) ABSTRACT

A process control or safety instrumented system uses function block logic to coordinate the logic within the process control or safety instrumented system with operational states of field devices, even when these operational states are initiated externally to the process control or safety system. Logic within input or voter function blocks associated with field devices may monitor and determine when the associated field devices are being put into testing or calibration modes and may automatically initiate appropriate bypass or override functionality in response to such detected field device configuration states. Likewise, the function block logic may automatically remove the bypass or override functionality when the field devices are placed back into their normal operational configuration states. This automatic initiation of bypasses and overrides helps to prevent a safety system within a process plant from initiating a shut-down procedure as a result of a device test initiated manually by, for example, a hand-held device attached to a field device. Likewise, the automatic removal of bypasses and overrides helps to prevent a safety system within a process plant from failing to operate properly because a user forgot to manually remove a bypass or override that was set up to allow a device test.

57 Claims, 4 Drawing Sheets

U.S. PATENT DOCUMENTS

| | | |
|---|---|---|
| 2002/0091451 A1 | 7/2002 | Summers et al. |
| 2002/0145515 A1 | 10/2002 | Snowbarger et al. |
| 2003/0062494 A1 | 4/2003 | Snowbarger et al. |
| 2004/0193290 A1 | 9/2004 | Ott et al. |
| 2004/0199351 A1 | 10/2004 | Ott et al. |

OTHER PUBLICATIONS

Search Report under Section 17(5) issued in GB 0407444.9 application by the United Kingdom Patent Office on Aug. 9, 2004.

Search Report under Section 17(5) issued in GB0407892.9 application by United Kingdom Patent Office on Aug. 12, 2004.

U.S. Appl. No. 10/409,576, dated Apr. 8, 2003, "Voter Logic Block Including Operational and Maintenance Overrides in a Process Control System."

Abstract of JP2000047724 A, publication dated Feb. 18, 2000.

Abstract of JP59091507 A, publication dated May 26, 1984.

| Configured voting scheme | One input bypassed (use configured NUM_TO_TRIP) | One input bypassed (reduce NUM_TO_TRIP) |
|---|---|---|
| 2oo3 | 2oo2 | 1oo2 |
| 2oo2 | Trip Inhibited | 1oo1 |
| 1oo2 | 1oo1 | 1oo1 |
| 1oo1 | Trip Inhibited | Trip Inhibited |
| 2oo4 | 2oo3 | 1oo3 |
| 6oo8 | 6oo7 | 5oo7 |

FIG. 3

| Configured voting scheme | Always Use Value | Will Not Vote if Bad | Vote to Trip if Bad |
|---|---|---|---|
| 2oo3 | 2oo3 or 1oo2 | 2oo2 | 1oo2 |
| 2oo2 | 2oo2 or 1oo1 | Trip Inhibited | 1oo1 |
| 1oo2 | 1oo2 or Tripped | 1oo1 | Tripped |
| 1oo1 | 1oo1 or Tripped | Trip Inhibited | Tripped |

FIG. 4

COORDINATION OF FIELD DEVICE OPERATIONS WITH OVERRIDES AND BYPASSES WITHIN A PROCESS CONTROL AND SAFETY SYSTEM

RELATED APPLICATIONS

This application is a continuation-in-part application claiming priority from U.S. patent application Ser. No. 10/404,156, entitled "On-Line Device Testing Block Integrated Into a Process Control/Safety System," which was filed on Apr. 1, 2003 now U.S. Pat. No. 6,898,542 and the entire disclosure of which is hereby expressly incorporated by reference herein.

FIELD OF TECHNOLOGY

The present invention relates generally to process control and safety systems used in process plants and, more particularly, to a system that coordinates field device operations with the use of overrides or bypasses within a process controller or a safety system controller.

DESCRIPTION OF THE RELATED ART

Process control systems, like those used in chemical, petroleum or other processes, typically include one or more process controllers communicatively coupled to at least one host or operator workstation and to one or more field devices via analog, digital or combined analog/digital buses or lines. The field devices, which may be, for example valves, valve positioners, switches and transmitters (e.g., temperature, pressure and flow rate sensors), perform functions within the process plant such as opening or closing valves and measuring process variables. The process controllers receive signals indicative of process measurements made by the field devices and/or other information pertaining to the field devices, use this information to implement control routines and then generate control signals which are sent over the buses or lines to the field devices to control the operation of the process. Information from the field devices and the controllers is typically made available to one or more applications executed by the operator workstation to enable an operator to perform any desired function with respect to the process, such as configuring the process, viewing the current state of the process, modifying the operation of the process, etc.

Furthermore, in many processes, a separate safety system is provided to detect significant safety related problems within the process plant and to automatically close valves, remove power from devices, switch flows within the plant, etc. when a problem occurs which might result in or lead to a serious hazard in the plant, such as a spill of toxic chemicals, an explosion, etc. These safety systems typically have one or more separate controllers apart from the standard process control controllers, called logic solvers, which are connected to safety field devices via separate buses or communication lines installed within the process plant. The logic solvers use the safety field devices to detect process conditions associated with significant events, such as the position of certain safety switches or shutdown valves, overflows or underflows in the process, the operation of important power generation or control devices, the operation of fault detection devices, etc. to thereby detect "events" within the process plant. When an event is detected, the safety controller takes some action to limit the detrimental nature of the event, such as closing valves, turning devices off, removing power from sections of the plant, etc. Generally, these actions include switching safety devices into a tripped or "safe" mode of operation which is designed to prevent a serious or hazardous condition within the process plant.

Function blocks within the safety instrumented system or logic solver may be programmed with logic that bypasses or overrides the use of a signal or detected condition of a field device when, for example, the signal received from the field device is bad, when logic within the field device is in a bad or non-normal mode, or when a manual signal is sent from an operator workstation to initiate such a bypass or override. For example, some analog input (AI) or digital input (DI) function blocks are programmed to provide a bypass or an override to logic within the safety system controller which prevents the safety system controller logic from using the output of the field device (i.e., the output of the AI or the DI block) as a valid input to be used in determining whether an event has occurred. These function blocks, however, typically provide such a bypass or override signal in response to a manual activation signal generated by an operator or engineer when a field device is, for example, undergoing maintenance.

Similarly, it is common practice in safety instrumented systems to use redundant input devices such as transmitters and switches to detect events within the system to provide greater safety integrity or process variable measurement availability. In such systems, it is sometimes necessary to provide voting logic functionality in the shutdown logic to determine whether the process condition is acceptable or dangerous based on the redundant inputs. Such voting logic is fairly straight-forward, in that it typically needs only to determine a majority vote of the inputs to detect if an event condition has occurred. Furthermore, as detailed in U.S. patent application Ser. No. 10/409,576, entitled "Voter Logic Block Including Operational and Maintenance Overrides in a Process Control System" which is assigned to the assignee of the present invention and which is hereby expressly incorporated herein by reference, it is possible to provide voting function blocks with override and bypass capabilities to, for example, prevent operation of the shut down system during startup of the process control system, to enable maintenance personnel to perform maintenance operations on one or more of the input devices, to allow selected process conditions to be temporarily ignored, etc.

Generally speaking, however, these bypasses or overrides, especially maintenance bypasses, are initiated manually by an operator or maintenance personnel at the start of maintenance procedures. To the extent that bypasses or overrides are initiated automatically within the voting logic or the logic solver, these overrides and bypasses are generally associated with activities being taken by the logic system, such as startup procedures, delay features, etc. and are not associated with an externally initiated change in the field device state from a normal state to a testing or calibration state. Thus, while engineers have, in the past, coordinated the bypass or override of field devices during field device testing procedures with the operational state of a logic solver in a system instrumented system, this coordination has been a manual process and is thus subject to human error. For example, when running a maintenance procedure on a field device, an engineer has to manually provide a bypass initiation signal to the safety instrumented logic to cause the input block such as the AI, DI or voter logic block associated with the field device to bypass the signal or input from the field device so as to prevent the safety logic from recognizing or detecting an event based on the field device signal and initiating a shut-down procedure. The function blocks within the logic solver have no mechanism for recognizing an externally initiated change in the state of a field device to a testing state and for automatically providing a bypass or override of the device outputs as a result of such a change in the field device.

Therefore, if the engineer forgets to manually set the bypass or override in the logic solver before initiating a field device test, the logic solver may detect a problem in the plant based on the signals from the field device being testing and cause a shut down procedure to occur unnecessarily. This shut down procedure can be costly in terms of lost material and time within the process plant and can be dangerous or hazardous to the person performing the device test, especially if the device test is being run manually from the plant floor. Furthermore, if the manual bypass or override is set within the safety logic solver, the engineer may forget to unset this override or bypass after completion of the maintenance procedure, thereby degrading the performance of the safety system and potentially leading to a failure to initiate a shut down procedure when such a procedure is appropriate based on a valid but ignored field device measurement or condition.

Still further, typical field devices incorporate a write protect mechanism that is designed to prevent configuration changes to the field device coming from un-authorized sources. In particular, field devices usually incorporate a write-protection variable that, when set, prevents any changes in the field device configuration settings and that, when not set, allows such changes. Furthermore, many of these field devices must undergo a power cycle to recognize the changed state of this write protection variable so that, to change the configuration of the field device to enable the field device to enter a testing state (such as a fixed current mode or calibration mode), the write protection variable must be set to the unprotected state and the field device must be cycled through a power-up procedure. While making the system less susceptible to unauthorized changes to the field devices, this write protection feature generally makes it possible to run only manual tests on a field device because the field device be manually powered off and on after resetting the write protection variable to place the field device in a condition that enables the field device to be tested. It is currently difficult or practically impossible to have the safety logic solver automatically initiate a device test or a calibration procedure on a field device when the field device is in a protected state because the field device write protection mechanism must be manually changed or switched off.

SUMMARY OF THE DISCLOSURE

A process control or safety instrumented system uses function block logic to coordinate the logic within the process control or safety instrumented system with operational states of field devices, even when these operational states are initiated externally to the process control or safety system. In particular, logic within input or voter function blocks associated with field devices may monitor and determine when the associated field devices are being put into testing or calibration modes and may automatically initiate appropriate bypass or override functionality in response to such detected field device conditions. Likewise, the function block logic may automatically remove the bypass or override functionality when the field devices are placed back into their normal operational modes. This automatic initiation of bypasses and overrides helps to prevent a safety system within a process plant from initiating a shut-down procedure as a result of a device test initiated manually by, for example, a hand-held device attached to a field device. Likewise, the automatic removal of bypasses and overrides helps to prevent a safety system within a process plant from failing to operate properly because a user forgot to manually remove a bypass or override that was set up to allow a device test.

Still further, the logic system and the field devices may be programmed with a subset of commands that can be initiated by the safety logic system to place the field device into testing or calibration modes, even when the field device is write protected. In this case, the logic system and field device may have additional protected commands that incorporate a write check mechanism, as required by IEC 61511, but that cause the field device to enter a fixed current mode or a calibration mode and that can be sent and initiated when the field device is still configured to be write protected. The new commands do not need to be protected by the write protection mechanism of the field device because they are initiated by a known and trusted source, e.g., the safety logic system. However, these new commands enable the logic system to change the configuration of a field device to place the field device into a testing or calibration mode without the need of a power-up or other manual procedure. As a result, the safety logic system can coordinate the necessary maintenance functions for the field device in a secure manner without exposing the field device to other undesirable configuration changes. Likewise, a safety system and the field device can store a record of the commands and responses sent between the field device and the logic solver to provide a complete log of actions taken on the field device, even when the field device is otherwise write protected. If desired, the additional subset of commands can be in the manufacturer specific category of, for example, Hart commands and can thus act in parallel to the existing commands that the field device supports. Using such a manufacturer communication capability, the logic solver can continuously monitor the state of the field device.

BRIEF DESCRIPTION OF THE DRAWINGS

FIG. 3 is a table of several exemplary voting schemes involving one bypassed input that can be used by the voter function block of FIG. 2;

FIG. 4 is an exemplary table indicating the manner in which a voting scheme may degrade when one of the inputs to the voter function block has a bad status.

DETAILED DESCRIPTION

Figure 1:
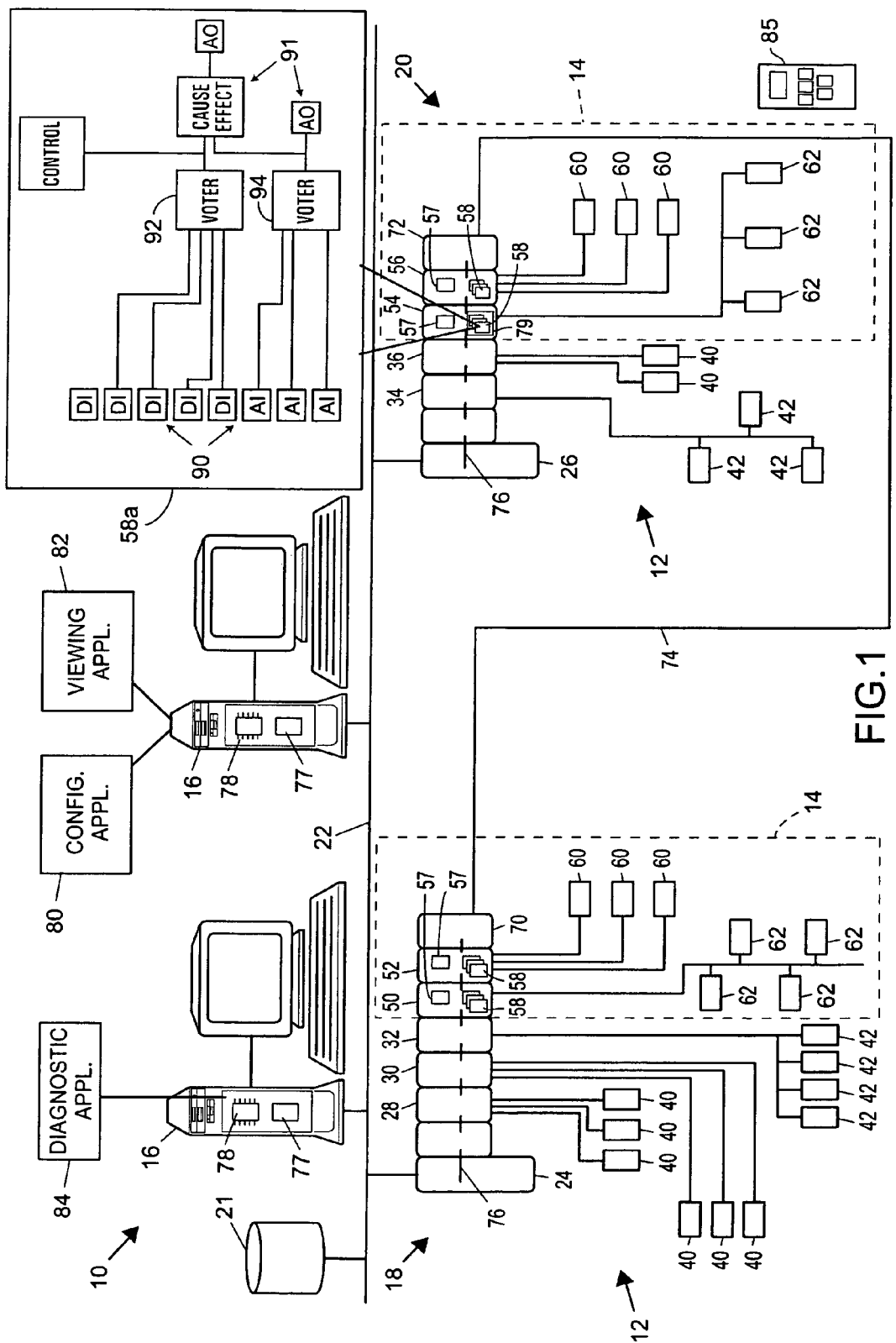
FIG. 1 is a block diagram of an exemplary process plant having a safety system that is integrated with a process control system and that uses one or more configurable AI, DI and voter function blocks to automatically control system shutdown and maintenance bypass and override activities within the process plant.

Referring now to FIG. 1, a process plant 10 includes a process control system 12 integrated with a safety system 14 (indicated by dotted lines), which generally operates as a Safety Instrumented System (SIS) that monitors and overrides the control provided by the process control system 12 to thereby maximize the likely safe operation of the process plant 10. The process plant 10 also includes one or more host workstations, computers or user interfaces 16 (which may be any type of personal computers, workstations, PDAs, etc.) which are accessible by plant personnel, such as process control operators, maintenance personnel, safety engineers, etc. In the example illustrated in FIG. 1, two user interfaces 16 are shown as being connected to two separate process control/safety control nodes 18 and 20 and to a configuration database 21 via a common communication line or bus 22. The communication network 22 may be implemented using any desired bus-based or non-bus based hardware, using any desired hardwired or wireless communication structure and using any desired or suitable communication protocol, such as an Ethernet protocol.

Generally speaking, each of the nodes 18 and 20 of the process plant 10 includes both process control system devices and safety system devices connected together via a bus structure that may be provided on a backplane into which the different devices are attached. The node 18 is illustrated in FIG. 1 as including a process controller 24 (which may be a redundant pair of controllers) as well as one or more process control system input/output (I/O) devices 28, 30 and 32 while the node 20 is illustrated as including a process controller 26 (which may be a redundant pair of controllers) as well as one or more process control system I/O devices 34 and 36. Each of the process control system I/O devices 28, 30, 32, 34 and 36 is communicatively connected to a set of process control related field devices, illustrated in FIG. 1 as field devices 40 and 42. The process controllers 24 and 26, the I/O devices 28–36 and the controller field devices 40 and 42 generally make up the process control system 12 of FIG. 1.

Likewise, the node 18 includes one or more safety system logic solvers 50, 52, while the node 20 includes safety system logic solvers 54 and 56. Each of the logic solvers 50–56 is an I/O device having a processor 57 that executes safety logic modules 58 stored in a memory 79 and is communicatively connected to provide control signals to and/or receive signals from safety system field devices 60 and 62. Additionally, each of the nodes 18 and 20 includes a message propagation device (MPD) 70 or 72, which are communicatively coupled to each other via a ring type bus connection 74 (only part of which is illustrated in FIG. 1). The safety system logic solvers 50–56, the safety system field devices 60 and 62, the MPDs 70 and 72 and the bus 74 generally make up the safety system 14 of FIG. 1.

The process controllers 24 and 26, which may be, by way of example only, DeltaV™ controllers sold by Emerson Process Management or any other desired type of process controllers, are programmed to provide process control functionality (using what are commonly referred to as control modules) using the I/O devices 28, 30 and 32 (for the controller 24), the I/O devices 34 and 36 (for the controller 26) and the field devices 40 and 42. In particular, each of the controllers 24 and 26 implements or oversees one or more process control routines stored therein or otherwise associated therewith and communicates with the field devices 40 and 42 and the workstations 14 to control the process 10 or a portion of the process 10 in any desired manner. The field devices 40 and 42 may be any desired types of field devices, such as sensors, valves, transmitters, positioners, etc., and may conform to any desired open, proprietary or other communication or programming protocol including, for example, the HART or the 4–20 ma protocol (as illustrated for the field devices 40), any fieldbus protocol such as the FOUNDATION® Fieldbus protocol (as illustrated for the field devices 42), or the CAN, Profibus, the AS-Interface protocols, to name but a few. Similarly, the I/O devices 28–36 may be any known types of process control I/O devices using any appropriate communication protocol(s).

The safety logic solvers 50–56 of FIG. 1 may be any desired type of safety system control devices that include a processor 57 and a memory that stores safety logic modules 58 adapted to be executed on the processor 57 to provide control functionality associated with the safety system 14 using the field devices 60 and 62. Of course, the safety field devices 60 and 62 may be any desired type of field devices conforming or using any known or desired communication protocol, such as those mentioned above. In particular, the field devices 60 and 62 may be safety-related field devices of the type that are conventionally controlled by a separate, dedicated safety-related control system. In the process plant 10 illustrated in FIG. 1, the safety field devices 60 are depicted as using a dedicated or point-to-point communication protocol, such as the HART or the 4–20 ma protocol, while the safety field devices 62 are illustrated as using a bus communication protocol, such as a Fieldbus protocol. The safety field devices 60 may perform any desired function, such as that of a shut-down valve, a shut-off switch, etc.

A common backplane 76 (indicated by a dashed line through the controllers 24, 26, the I/O devices 28–36, the safety logic solvers 50–56 and the MPDs 70 and 72) is used in each of the nodes 18 and 20 to connect the controllers 24 and 26 to the process control I/O cards 28, 30 and 32 or 34 and 36, as well as to the safety logic solvers 50, 52, 54 or 56 and to the MPDs 70 or 72. The controllers 24 and 26 are also communicatively coupled to, and operate as a bus arbitrator for the bus 22, to enable each of the I/O devices 28–36, the logic solvers 50–56 and the MPDs 70 and 72 to communicate with any of the workstations 16 via the bus 22.

As will be understood, each of the workstations 16 includes a processor 77 and a memory 78 that stores one or more configuration and/or viewing applications adapted to be executed on the processor 78. A configuration application 80 and a viewing application 82 are illustrated in an exploded view in FIG. 1 as being stored in one of the workstations 16 while a diagnostic application 84 is illustrated as being stored in the other one of the workstations 16. However, if desired, these and other applications could be stored and executed in different ones of the workstations 16 or in other computers associated with the process plant 10. Generally speaking, the configuration application 80 provides configuration information to a safety engineer and enables the safety engineer to configure some or all elements of the process plant 10 and to store that configuration in the configuration database 21. As part of the configuration activities performed by the configuration application 80, the safety engineer may create control routines or control modules for the process controllers 24 and 26, may create safety logic modules 58 for any and all of the safety logic solvers 50–56 (including creating and programming input, voter and other function blocks for use in the safety logic solvers 50–56 or even in the controllers 24 and 26) and may download these different control and safety modules to the appropriate ones of the process controllers 24 and 26 and the safety logic solvers 50–56 via the bus 22 and controllers 24 and 26. Similarly, the configuration application 80 may be used to create and download other programs and logic to the I/O devices 28–36, any of the field devices 40, 42, 60 and 62, etc.

Conversely, the viewing application 82 may be used to provide one or more displays to a user, such as to a process control operator, a safety operator, etc., which includes information about the state of the process control system 12 and the safety system 14 either in separate views or in the same view, if so desired. For example, the viewing application 82 may be an alarm display application that receives and displays indications of alarms to an operator. If desired, such an alarm viewing application may take the form as disclosed in U.S. Pat. No. 5,768,119 entitled "Process Control System Including Alarm Priority Adjustment" and U.S. patent application Ser. No. 09/707,580 entitled "Integrated Alarm Display in a Process Control Network," both of which are assigned to the assignee of this patent and are hereby expressly incorporated by reference herein. It will be understood, however, that the alarm display or alarm banner of these patents may receive and display alarms from both the process control system 12 and the safety system 14 in an integrated alarm display as the alarms from both systems 12 and 14 will be sent to the operator workstation 14 executing the alarm display application and will be recognizable as alarms from different devices. Likewise, an operator may deal with safety alarms displayed in an alarm banner in the same manner as process control alarms. For example, the operator or user may acknowledge safety alarms, turn off safety alarms, etc. using the alarm display, which will send messages to the appropriate process controller 24, 26 within the safety system 14 using communications over the bus 22 and the backplane 76 to take the corresponding action with respect to the safety alarm. In a similar manner, other viewing applications may display information or data from both the process control system 12 and the safety system 14 as these systems may use the same types and kinds of parameters, security and referencing so that any data from one of the systems 12 and 14 can be integrated into a display or view traditionally provided for a process control system.

The diagnostic application 84 may be used to implement diagnostics or maintenance programs within the process control and safety system of the plant 10. Such a diagnostic application, which may perform any desired types of diagnostics or maintenance procedures, such as running process and valve tests, startup procedures, etc., may or may not provide overrides to one or more AI, DI or voter function blocks used within the process plant 10 to prevent operation of the safety system based on inputs from one or more devices effected by the diagnostic procedures. Likewise, a hand-held configuration or testing device 85 may be connected to any of the field devices 40, 42, 60 and 62 to perform configuration, testing and calibration procedures on these field devices with or without sending a bypass or override signal to one or more of the AI, DI or voter function blocks within the process plant 10.

In any event, the applications 80, 82 and 84, as well as any other applications may send separate configuration and other signals to and may receive data from each of the process controllers 24 and 26 as well as from each of the safety system logic solvers 50–56. These signals may include process-level messages related to controlling the operational parameters of the process field devices 40 and 42, and may include safety-level messages related to controlling the operational parameters of the safety-related field devices 60 and 62. While the safety logic solvers 50–56 may be programmed to recognize both the process-level messages and the safety-level messages, the safety logic solvers 50–56 are capable of distinguishing between the two types of messages and will not be capable of being programmed or effected by process-level configuration signals. In one example, the programming messages sent to the process control system devices may include certain fields or addresses which are recognized by the safety system devices and which prevent those signals from being used to program the safety system devices.

If desired, the safety logic solvers 50–56 may use the same or a different hardware or software design as compared to the hardware and software design used for the process control I/O cards 28–36. The use of alternate technologies for the devices within the process control system 12 and devices within the safety system 14 may minimize or eliminate common cause hardware or software failures. Furthermore, the safety system devices, including the logic solvers 50–56 may use any desired isolation and security techniques to reduce or eliminate the chances of unauthorized changes being made to the safety-related functions implemented thereby. For example, the safety logic solvers 50–56 and the configuration application 80 may require a person with a particular authority level or a person located at a particular workstation to make changes to the safety modules within the logic solvers 50–56, with this authority level or location being different from the authority or access level or location needed to make changes to the process control functions performed by the controllers 24 and 26 and the I/O devices 28–36. In this case, only those persons designated within the safety software or located at workstations authorized to make changes to the safety system 14 have authorization to alter safety-related functions, which minimizes the chances of corruption to the operation of the safety system 14. As will be understood, to implement such security, the processors within the safety logic solvers 50–56 assess the incoming messages for proper form and security and operate as gatekeepers on changes being made to the safety-level control modules 58 executed within the safety logic solvers 50–56.

The use of the backplane 76 in each of the nodes 18 and 20 enables the safety logic solvers 50 and 52 and the safety logic solvers 54 and 56 to communicate locally with one another to coordinate safety functions implemented by each of these devices, to communicate data to one another, or to perform other integrated functions. On the other hand, the MPDs 70 and 72 operate to enable portions of the safety system 14 that are disposed at vastly different locations of the plant 10 to still communicate with one another to provide coordinated safety operation at different nodes of the process plant 10. In particular, the MPDs 70 and 72 in conjunction with the bus 74 enable the safety logic solvers associated with different nodes 18 and 20 of the process plant 10 to be communicatively cascaded together to allow for the cascading of safety-related functions within the process plant 10 according to an assigned priority. Alternatively, two or more safety-related functions at different locations within the process plant 10 may be interlocked or interconnected without having to run a dedicated line to individual safety field devices within the separate areas or nodes of the plant 10. In other words, the use of the MPDs 70 and 72 and the bus 74 enables a safety engineer to design and configure a safety system 14 that is distributed in nature throughout the process plant 10 but that has different components thereof communicatively interconnected to enable the disparate safety related hardware to communicate with each other as required. This feature also provides scalability of the safety system 14 in that it enables additional safety logic solvers to be added to the safety system 14 as they are needed or as new process control nodes are added to the process plant 10.

If desired, the logic solvers 50–56 may be programmed to perform control activities with respect to the safety devices 60 and 62, using a function block programming paradigm. In particular, as illustrated in an expanded view of one of the safety control modules 58a (stored in the memory 79) of the logic solver 54, a safety control module may include a set of communicatively interconnected function blocks that can be created and downloaded to the logic solver 54 for implementation during operation of the process 10. As illustrated in FIG. 1, the control module 58a includes two voter function blocks 92 and 94 having inputs communicatively interconnected with other function blocks 90, which may be, for example, analog input (AI), digital input (DI) function blocks, or other function blocks designed to provide signals to the voter function blocks 92. The voter function blocks 92 and 94 have at least one output connected to one or more other function blocks 91 which may be analog output (AO), digital output (DO), cause and effect function blocks which implement cause and effect logic, control and diagnostic function blocks which may receive output signals from the voter function blocks 92 and 94 to control the operation of the safety devices 60 and 62, etc. Of course, the safety control module 58a may be programmed in any desired manner to include any types of function blocks along with one or more voter function blocks configured in any desired or useful manner to perform any desired functionality. Additionally or alternatively, other input function blocks, such as AI and DI function blocks may be coupled directly to safety system logic for providing a safety logic control module that responds to events detected by the AI or DI blocks by activating one or more shut-down devices upon the occurrence of one or more such events.

Thus, while the expanded view of the safety control module 58a of FIG. 1 includes a digital voter function block 92 having five digital inputs and an analog voter function block 94 having three analog inputs, it will be understood that any number of different safety logic modules 58 can be created for and used within each of the different logic solvers 50–56 and each of these modules can include any number of AI, DI, voter or other input function blocks having any desired number of inputs communicatively connected to other function blocks in any desired manner. Likewise, if used in, for example, a Fieldbus network, the voter function blocks 92 and 94, which may be any fieldbus type function blocks, or any of the other function blocks connected thereto could be located and implemented in other devices, such as in the field devices 62. If used outside of a safety system, the voter function blocks 92 and 94 as well as the other input function blocks could be implemented in the process controllers 24, 26, the I/O devices 28–36, the field devices 42, etc. As will be generally understood, the voter function blocks 92 and 94 receive typically redundant inputs provided by redundant sensors or transmitters within the safety system 14 and apply a voting scheme to those inputs to determine if, based on all of those inputs, a safety system trip condition exists. Additionally, these voter function blocks may be programmed to initiate bypasses or overrides within the safety system logic.

Figure 2:
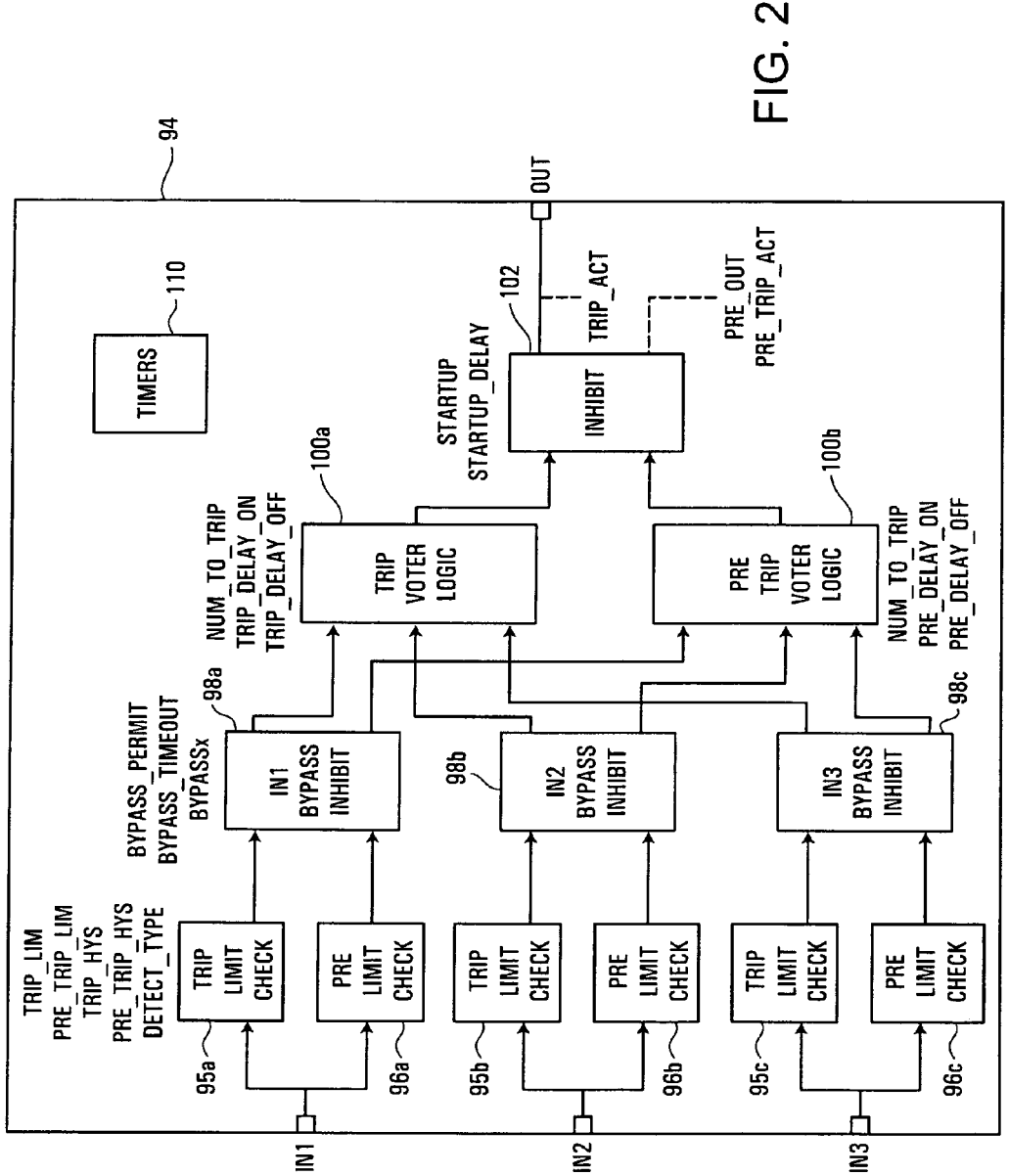
FIG. 2 is block diagram of one of the configurable voter function blocks of FIG. 1 incorporating bypass and override functionality.

FIG. 2 is a block diagram illustrating the components of the example voter function block 94 of FIG. 1 having bypass and override capabilities. The voter function block 92 is an analog voter function block in that it processes analog input signals delivered via, for example, analog input (AI) function blocks 90. In general, the voter function block 94 includes three inputs labeled IN1, IN2 and IN3 which are adapted to receive analog input signals from, for example, redundant sensors or other redundant elements within the process plant 10 such as from the field devices 60 and 62 of FIG. 1. Each of the inputs IN1, IN2 and IN3 is provided to one of a trip limit check block 95a, 95b or 95c and to a pre-limit check block 96a, 96b or 96c. The trip limit check blocks 95 compare the input delivered thereto to a preset limit to determine if the input signal has reached a value (which may be a high value, a low value or a value within a predetermined range) associated with a trip condition. In a similar manner, the pre-limit check blocks 96 compare the input delivered thereto to a preset pre-limit to determine if the input signal has reached a value (which may be a high value, a low value or a value within a predetermined range) associated with an alarm or a warning that indicates that a trip condition, while not yet existing, is close to existing. In effect, the pre-limit check blocks 96 enable an alarm or event signal to be created that indicates that a hazardous or otherwise undesirable condition is close to existing, even though it does not yet exist.

The outputs of the trip limit check blocks 95 and the pre-limit check blocks 96 (which may be, for example, digital signals that are set to a high value when the limits or the pre-limits are met in the blocks 95 and 96) are each delivered to one of a set of input bypass inhibit blocks 98a, 98b and 98c. The input bypass inhibit blocks 98 perform input inhibits on the individual inputs IN1, IN2 and IN3 so that one or more of these inputs may be inhibited, that is, not used within the voter function block 94 to determine if a trip condition exists or if a pre-trip alarm condition exists. Each of the input bypass inhibit blocks 98 provides an output for the associated trip limit condition to a trip voter logic block 100a and provides an output for the associated pre-limit condition to a pre-trip voter logic block 100b. The voter logic blocks 100a and 100b perform voter logic of any desired operation to determine if, based on the inputs thereto, a trip condition or a pre-trip alarm condition exists.

The trip voter logic block 100a and the pre-trip voter logic block 100b provide a trip signal and a pre-trip alarm signal (when these conditions are determined to exist), respectively, to an inhibit or override block 102 which may inhibit the voter function block 94 from providing any trip signal or pre-trip alarm signal output during, for example, a startup or other performance, run-time or maintenance procedure in which it is desirable to inhibit the operation of the voter function block 94. The inhibit block 102 develops a trip output signal (labeled Out) determined as a result of the operation of the trip voter logic block 100a and the startup inhibit block logic and additionally develops a Pre_out signal determined as a result of the operation of the pre-trip voter logic block 100b and the startup inhibit block logic. The Out signal may be used to drive the operation of a shutdown procedure within the safety system 14 of FIG. 1, while the Pre_out signal may be used to provide alarming to indicate the fact that a trip condition is close to existing within the process plant 10. Of course, the Out and the Pre_out signals may be used for other purposes if so desired.

The voter function block 94 may include a set of parameters, some of which are indicated in FIG. 2 above or below the blocks in which they are used, which are set during, for example, configuration of the voter function block 94 to effect or specify the operation of the voter function block 94. In particular, a trip limit (Trip_Lim) and a pre-trip limit (Pre_Trip_Lim) parameter are used to set or establish the trip limits used in the trip limit blocks 95 and to set the pre-trip limits used in the pre-limit check blocks 96. The trip limit and/or the pre-trip limit parameters may be the same for each of the different blocks 95 and 96 or may be set individually for each of the block 95 and 96. Similarly, a trip hysteresis (Trip_Hys) and a pre-trip hysteresis (Pre_Trip_Hys) parameter are used to set the hysteresis that the blocks 95 and 96 must travel through between successive trips. That is, once one of the blocks 95 or 96 detects one of the input signals being above (or below) a limit, the hysteresis value of the type hysteresis parameter (for the blocks 95) and the hysteresis value of the pre-trip hysteresis parameter (for the blocks 96) determine how far below (or above) the limit the input signal must travel before the trip signal (or pre-trip signal) is turned off or before enabling a second trip signal (or pre-trip signal) to be set by that block.

The voter function block 94 also has an internal trip type configuration parameter named Trip_Type which defines the normal and tripped state values associated with the inputs and/or outputs of the voter function block 94. For example, when the voter function block 94 is configured as 'De-energized to Trip' (which may be the default value), the normal operating value of the output is one and the tripped state value is zero. Conversely, when the voter function block 94 is configured as 'Energized to Trip,' the normal operating value is zero and tripped state value is one. This initial determination is made at the trip limit check blocks 95a, 95b and 95c and at the pre-limit check blocks 96a, 96b and 96c, which correspond to the inputs IN1, IN2, and IN3, respectively. A detect type (Detect_Type) parameter may be used to determine whether the comparison to the trip limit is to be a greater than (high limit) comparison or to be a less than (low limit) comparison. This comparison occurs at the appropriate trip limit check blocks 95 and the pre-limit check blocks 96 to determine if the input signals have reached the predetermined limits.

As will be understood, the outputs of the trip limit check blocks 95 will each indicate whether a trip is indicated by a corresponding one of the inputs IN1, IN2 and/or IN3. As discussed above, a maintenance override or bypass can be applied by the input bypass inhibit blocks 98 for each of the individual inputs IN1, IN2 and IN3 to prevent those inputs from being used in the voting logic applied by the voter logic blocks 100. This bypass feature is desirable when, for example, maintenance is being performed on a transmitter or other field device providing the input signal to the voter function block 94. When using voting logic that determines a trip output based on multiple inputs, maintenance bypasses are not always a necessity because a single false vote to trip (that may result due to maintenance activities on the sensor providing the input) will not necessarily result in a trip. However, this bypass functionality is desirable to prevent false trips during maintenance activities and may be needed in some voter logic, such as in a one out of two voter logic scheme in which the existence of even a single trip signal from redundant sensors will result in a trip.

When one of the input bypass inhibit blocks 98 causes an input to be bypassed, the bypassed input will not be used by the voter logic blocks 100a and 100b to develop a trip signal or a pre-trip alarm signal, even if the input value exceeds the limits specified by the trip limit or the pre-trip limit parameters. To enable bypassing, a bypass permit (Bypass_Permit) parameter can first be enabled to control whether bypassing of the inputs is to be allowed in the first place. Generally speaking, bypassing on inputs will be allowed if the Bypass_Permit parameter is set or enabled while input bypassing will not be allowed if the Bypass_Permit parameter is unset or not enabled. While a single Bypass_Permit parameter may be applicable for all of the bypass inhibit blocks 98, a separate bypass permit may be set for each of input bypass inhibit blocks 98a, 98b, 98c.

If the Bypass_Permit parameter is set or enabled, then a BYPASSx parameter may be used to cause one or more of the bypass inhibit blocks 98 to operate to inhibit the use of an associated one of the inputs IN1, IN2 or IN3. The x in the BYPASSx parameter indicates which one of the inputs IN1, IN2 or IN3 is to be disabled. If desired, more than one input may be inhibited at any particular time or the voter function block 94 may be configured to allow only one input to be inhibited at a time. The Bypass_Permit and the BYPASSx parameters may be set or issued in any desired manner, such as by an operator display button on an operator or maintenance screen, a physical keyswitch, a discrete input into the safety module, by a configuration, control, display or diagnostic application, by another input function block (as will be described in more detail below) or in any other manner. Of course, if the use of a bypass permit is not needed in any particular implementation of the voter function block 94, the default value of the Bypass_Permit parameter can be set to be enabled at configuration of the voter function block 94.

A bypass timeout (Bypass_Timeout) parameter may be used to set the amount of time after which a bypass for one of the blocks 98 is set that the bypass will automatically expire. In this case, each of the input bypass inhibit blocks 98 may include as one of a set of timers 110 a bypass timer that is set to the Bypass_Timeout parameter value and that may be counted down at the start of the bypass. In this situation, the input bypass inhibit blocks 98 may inhibit the use of the associated input until the BYPASSx is turned off or until the bypass timer reaches zero. As will be understood, bypass timers may be used to assure that bypasses are removed after a predetermined amount of time.

If desired, the input bypass inhibit blocks 98 may also be configured to provide a reminder alarm to a user, such as an operator, safety engineer, technician, etc. to remind or notify the user that a bypass timeout is imminent. If bypasses are configured to disappear or be unenabled upon a bypass timeout, notification can be sent to a user or other operator in advance of the timeout by setting a reminder time (REMINDER_TIME) parameter to some non-zero value. In this case, if the bypass timer is non-zero but is less than the reminder time parameter and any bypassed input is voting to trip, the reminder alarm can be activated to provide an alarm to the user to indicate that a shut down may occur upon expiration of the bypass timer, which is imminent. If there are no bypassed inputs voting to trip, the alarm does not need to be activated, although it may still be activated. It will be understood, however, that even when the bypass timeout alarm is active, a trip is not necessarily imminent because there may not be enough other inputs voting to trip to cause the trip voter logic block 100a to produce a trip signal.

In one embodiment, the bypass timer may be re-armed only when the first bypass is timed-out. However, the bypass timer may be a write-able parameter so that, after notification that a timeout is about to occur, the bypass timer can be incremented using an operator display button (or some other suitable technique) to extend the bypass time. Such a feature enables a user to extend the bypass time when, for example, a maintenance procedure is still being performed on the field device providing the bypassed input to the voter function block 94. Alternatively, the notification of bypass timeout may be for indication purposes only when, for example, a bypass is not to be unenabled when the bypass timer times out. In this case the reminder alarm may be set to be active when the bypass timer times out, even if the reminder time parameter is set to zero. However, if the reminder time parameter is non-zero, the reminder will still occur prior to timeout (if the input is voting to trip). The reminder alarms and bypass alarms may be acknowledged or non-acknowledged alarms.

The voting logic performed by the voter logic blocks 100*a* and 100*b* may be a "M out of N" logic function. According to this functionality, M inputs must vote to trip out of the total of N inputs. For example, the voter function block 94 can be configured as a two out of three (2oo3) voter, which means that two of the three inputs must meet the trip limit before the voter logic block 100*a* output is set to the trip state value and two out of three of the inputs must meet the pre-trip limit before the pre-trip voter logic block 100*b* is set to a pre-trip alarm value. The N value in the "M out of N" function is determined from the number uninhibited inputs while the M value is determined based on an internal parameter of the block called number to trip (NUM_TO_TRIP), whose default value may be set to any desired value equal to or less than N at configuration. Common voting schemes may include, for example, two out of three, (2oo3), one out of two (1oo2), two out of two (2oo2), etc. However, any other voting logic may be used. Because of the other features of the block 94, the voter function block 94 may also be used for single transmitter applications such as in a one out of one (1oo1) voter function logic situation.

Generally speaking, 2oo2 or 1oo1 voting schemes will need a maintenance bypass function because disabling even one of the transmitters in a manner that causes a detected trip condition at the input of the voter function block 94 for that transmitter during maintenance activities will necessarily result in a trip condition being set by the voter logic block 100*a*. However, voter function blocks configured to require multiple votes to trip can still benefit from a bypass function for more predictable behavior during maintenance procedures.

Bypassing one of the inputs IN1, IN2 or IN3 may effect the voter logic blocks 100*a* and 100*b* in one of two manners. It may either cause the number of inputs needed to determine a trip condition (or a pre-trip alarm condition) to be reduced by one or it may cause this number of inputs to remain the same. For example, when the voter logic block 100*a* is configured as a 2oo3 voter logic block and one of the inputs IN1, IN2 or IN3 is bypassed, the voting scheme may then become a 1oo2 voting scheme, meaning that the number of inputs needed to vote to trip is reduced by one (along with the number of possible inputs). Optionally, the 2oo3 voting scheme may be changed to a 2oo2 voting scheme when a selected input is bypassed, meaning that the number of inputs needed to vote to trip stays the same (even though the number of possible inputs is reduced by one). A bypass options parameter may be used to specify whether the actual number required to trip is to be reduced by one or not when an input is bypassed. FIG. 3 illustrates the effect of this option on several different voting schemes. The first column of FIG. 3 indicates the configured voting logic scheme with no inhibited inputs, the second column of FIG. 3 indicates the voting logic when a single input is inhibited using the originally configured number to trip M and the third column of FIG. 3 indicates the voting logic when a single input is inhibited and reducing the number to trip M by one. Of course, additional input inhibits could cause similar changes from the values indicated in the second and third columns of FIG. 3. In any event, the trip voter logic block 100*a* (and the pre-trip voter logic block 100*b*) will generally not reduce the actual number of inputs required for a trip to be less than one and will inhibit tripping when the possible inputs to vote to trip is reduced to zero, such as in a 1oo1 voter scheme.

The default behavior of the input bypass inhibit blocks 98 may be configured to allow only one input to be bypassed at a time. This functionality may be enforced by a writecheck feature, which prevents a second input from being bypassed. Optionally, multiple inputs can be bypassed simultaneously. If desired, the BYPASSx parameter may have an additional writecheck, which requires the bypass permit BYPASS_PERMIT parameter to be true or set before the BYPASSx parameter may be set.

After voting is performed at the trip voter logic block 100*a*, according to the selected M out of N voting scheme, a trip-delay-on time parameter TRIP_DELAY_ON may be applied so that the voted trip condition must be active for a configurable period of time (the default value of which may be set at zero seconds) before the OUT signal changes to the tripped state value. In a similar manner, a trip-delay-off time parameter TRIP_DELAY_OFF (the default value of which may be set at zero seconds) may be applied to delay the time at which the OUT signal is returned to the normal state value when the vote to trip condition clears, i.e., when the trip voter logic block 100*a* determines that a trip condition does not exist based on the inputs thereto. Of course, the trip-delay-on time parameter and the trip-delay-off time parameter may have different and any desired values, and may be applied to one or both of the Out signal produced by the trip voter logic block 100*a* and the Pre-out alarm signal produced by the pre-trip voter logic block 100*b*. If desired, the trip-delay-on time and the trip-delay-off time periods may be independently configurable for the trip voter logic block 100*a* and the pre-trip voter logic block 100*b* and may be tracked by one of the timers 110.

As indicated above, the inhibit block 102 provides for startup or other operational override functionality. If desired, this override functionality may be initiated by another function block, such as in input function block (as will be described in more detail below). It may, for example, be necessary to override the output of the voter function block 94 to force the Out signal to be in the normal state for a brief period of time during startup or other temporary operational situations, including some field device testing situations. This inhibit or override functionality may be used, for example, to inactivate a standing trip demand generated by the voter function block 94 because the process or a relevant portion thereof is in a shutdown state, a field device is in a maintenance condition, etc., to thereby allow the process startup procedure to proceed to the point where the process values being provided at the inputs of the voter function block 94 are no longer at values that indicate that a trip should be initiated or to enable a full and complete maintenance procedure to be performed on one or more field devices.

In one example, the inhibit block 102 may include default behavior such that, on receiving an indication of a startup, which may be indicated by setting a Startup parameter, the inhibit block 102 forces the Out signal and, if desired, the Pre_out signal to the normal state value for a configurable period of time defined by a startup delay (STARTUP_DELAY) parameter. The inhibit block 102 may include a startup countdown timer as one of the timers 110 which is set to the value specified by the startup delay parameter and which starts to countdown upon receiving the startup indication via the startup parameter. When the countdown timer times out, the trip voter logic block 100*a* and the pre-trip voter logic block 100*b* resume normal trip detection. The inhibit block 102 may be configured such that a subsequent setting of the startup parameter will not affect the startup time while the startup timer is timing down. Optionally, it is possible to allow each new setting of the startup parameter to re-arm the startup timer so that a pending trip on timeout can be avoided.

Similar to the input bypass inhibit blocks 98, the inhibit block 102 may have a reminder function which may be turned on by, for example, setting a bypass parameter. This reminder functionality operates for startup bypasses in essentially the same manner as it operates for input bypasses (maintenance bypasses). Thus, when the startup timer is greater than zero but less than a configurable reminder time (REMINDER_TIME) parameter (which may be set at configuration) and there are enough votes to trip, a reminder alarm condition becomes active indicating that the bypass is about to expire which will result in a shutdown based on the values of the inputs IN1, IN2 and IN3.

If desired, the startup timer may additionally or alternatively automatically expire when the inputs have stabilized, that is, when there have not been enough votes to trip for a configurable period of time. This stable time may be tracked by a stable timer which may be one of the timers 110 and which may detect when the output of the voter logic block 100a is stable at, for example, a non-trip or normal value for the specified period of time. In this case, while the startup timer is timing down, the stable timer may time up whenever there are not enough votes to trip and may reset whenever the trip votes meet or exceed the number required to trip. If the stable timer reaches the configured stable time value, the startup timer is reset to zero and the normal trip detection functionality resumes. Of course, the stable timer does not reset at the end of the startup time period, but is reset at the beginning of a startup and at any time during the startup inhibit period when there are enough trip votes.

Alternatively, the startup bypass time need not be based on a fixed time period or on values of the inputs IN1, IN2 and IN3 to the voter function block 94 but can, instead, be based on the occurrence or nonoccurrence of an event. In this case the startup bypass ends when a startup reset parameter is set or becomes set or true, which may occur upon the detection of the event. In this manner, the startup bypass may be tied to the existence or non-existence of an event of indeterminable time length.

If desired, the status of the inputs IN1, IN2 and/or IN3 may be used to influence the behavior of the voter function block 94 and this status behavior may be set using a status options parameter. As will be understood, in many systems, such in HART and Fieldbus systems, transmitters or other field devices will send a status signal along with a process variable signal or a process value, wherein the status signal indicates the status of the transmitter itself. Such status signals may indicate that the transmitter is in a normal or good state, or in an abnormal state, such as a bad or other undesirable state which may cause the value of the process variable being sent by the transmitter to be of questionable nature. Thus, the status of the inputs signals provided to the IN1, IN2 and IN3 inputs of the voter function block 94 may be determined and used to effect the voting scheme or the manner in which the inputs will be used in the voting scheme.

If desired, the voting schemes used by the blocks 100 may be set so that one failed transmitter (i.e., one input having a bad status) will not automatically initiate a trip when other transmitters are available to indicate a valid value of the process variable being measured. When considering the status of the input signals, one option is to always use the value of the input IN1, IN2 or IN3 regardless of the status of the input. In this manner, a hardware failure will not necessarily cause a shutdown and time will be allowed for repair. Another option is to treat a bad status on an input as if the input were bypassed, which prevents the input from voting to trip in the same manner as described above with respect to the input bypass inhibit blocks 98. A third option is to automatically consider the input as a vote to trip if the status of the input is bad. This may be configured as the default option, which provides the highest level of safety for 1ooX voting schemes. FIG. 4 illustrates the manner in which several common voting schemes degrade when a single input has a bad status for each of the options described above. For example, as illustrated in the first row and first column of FIG. 4, a 2oo3 voting scheme effectively degrades to either a 2oo3 (if the value of the signal from the bad transmitter is a non-trip value) or a 1oo2 voting scheme (if the value of the signal from the bad transmitter is a trip value) when the value of the input is always used. Conversely, as illustrated in the first row and second column of FIG. 4, the 2oo3 voting scheme degrades to a 2oo2 voting scheme if the value of the bad transmitter is not used at all (or may degrade to a 1oo2 scheme depending on the bypass feature selected). Similarly, as illustrated in the first row and the third column of FIG. 4, the 2oo3 voting scheme effectively degrades to a 1oo2 voting scheme if the value of the bad transmitter is treated as a vote to trip, no matter what the actual value of that signal may indicate.

Of course, the use of the status of the inputs to the voter function block 94 may be treated the same or differently in each of the trip voter logic block 100a and the pre-trip voter logic block 100b. If desired, the status of the Out signal and the Pre_out signal may be set as Good unless all non-bypassed inputs have a bad status, in which case, the status of the Out and the Pre_out signals may be set as Bad. If desired, when any non-bypassed input has a bad status, an alarm condition parameter indicating a bad input may be set by the voter function block 94.

As will be understood from the discussion above, the voter function block may thus include bypass and override functionality therein. However, in the past, this functionality was initiated either by the mode or status of the inputs to the voter function block or by a manual signal sent from and operator, such as from one of the operator displays devices 16, initiating this functionality. However, the input function blocks themselves may be configured to detect when a field device is placed in a configuration or mode not associated with the normal operation of the field device, such as a testing or calibration mode. For example, HART devices may be placed in a fixed current mode to check the input to the logic solver and the associated field wiring or to perform calibration and, upon doing so, may use Hart communications to indicate that the field device is in fixed current mode. The logic solver, using one of the input function blocks, can detect this fixed current mode and automatically initiate bypass or override functionality within the logic solver (such as the bypass or override functionality of the voter function block as described above) to treat the associated inputs from the field device as, for example, bypassed. Likewise, the input function blocks may detect the return of the field device from the fixed current mode to the normal operational mode and may include logic that removes the bypass or the override to thereby automatically assure that the field device input is used in the safety logic to detect events within the process plant. Of course, other removal logic, such as the time-out features described above, may be used to remove the bypass or override features automatically detected by the input function blocks.

Figure 5:
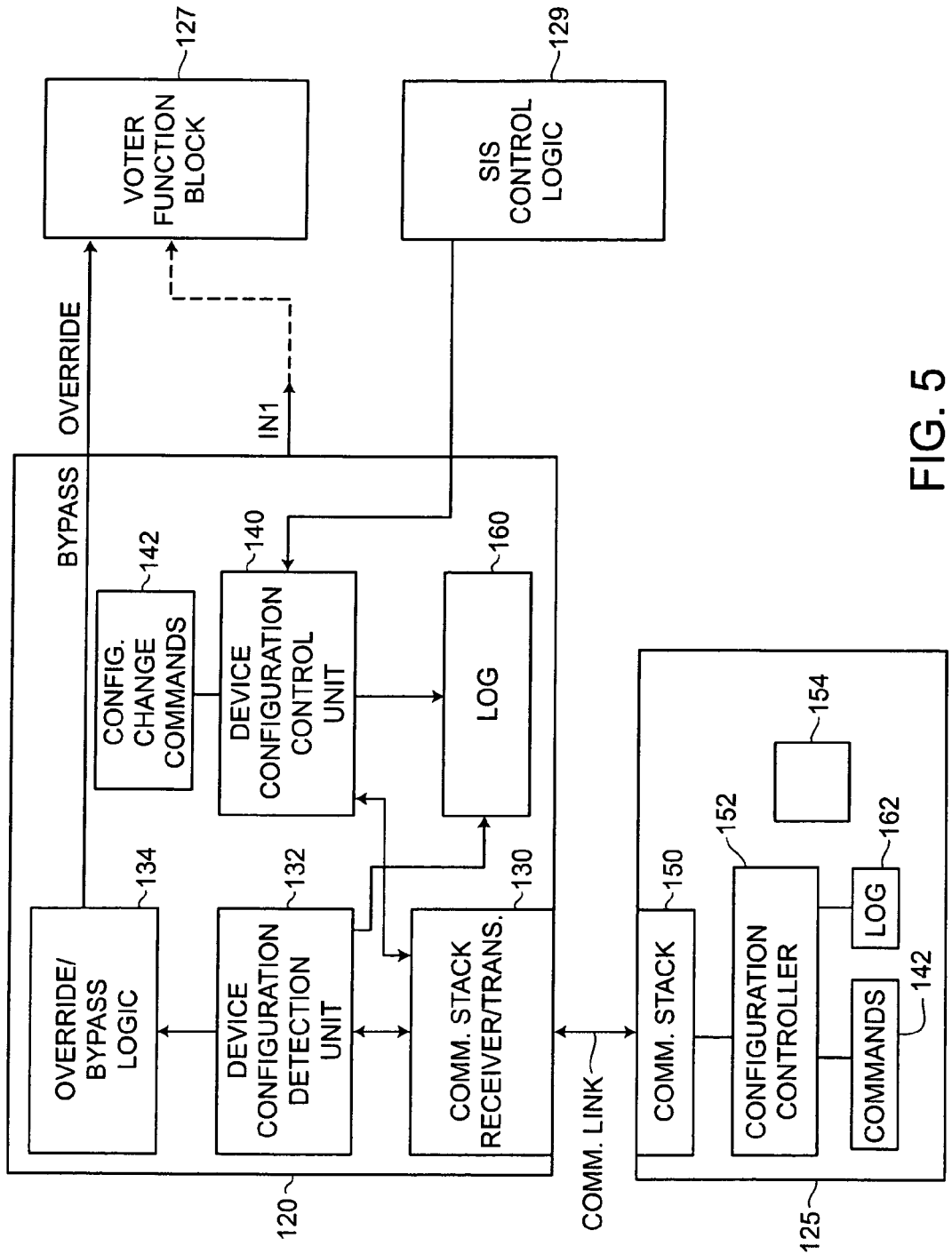
FIG. 5 is a block diagram of an input function block having field device state detection and initiation logic communicatively coupled between a field device and associated bypass and override functionality within the function block for controlling logic within a safety logic solver based on detected field device states as well as for controlling the field device configuration.

FIG. 5 illustrates an input function block 120 which, in this case is an AI function block, incorporating logic that automatically detects the configuration state of an associated field device and that uses this detected state to generate or initiate appropriate bypass or override functionality within the logic solver. As illustrated in FIG. 5, the function block 120 is communicatively connected to a field device 125, a voter logic block 127 and other safety system logic 129. The input function block 120 may include a standard communication stack 130 that communicates with the field device 125 using any desired communication protocol, such as a standard communication protocol like the HART communication protocol or the Fieldbus communication protocol. Of course, the communication stack provides software for communicating with the field device 125 to receive standard (or if desired, non-standard) communications from the field device 125 and to send messages to the field device 125 if so desired.

A device configuration detection block 132 is connected to the communication stack 130 to receive and decode messages from the field device 125 to determine the configuration state of the field device 125. Not shown in FIG. 5, but included in the input function block 120 is standard software for communicating with the field device to receive signals from the field device 125, decode and interpret these signals to produce the IN1 signal at an output of the function block 120. The IN1 signal may be provided, for example, to the voter function block 127 or to any other desired block within the safety system logic.

The input function block 120 may also include a device configuration detection block 132 which may, for example, receive and detect signals (e.g., messages) from the field device 125 indicating that the field device 125 has been placed into a fixed current mode (indicating the that field device 125 has been externally placed into a testing mode by, for example, the hand-held configuration device 85 of FIG. 1) or some other non-normal operating configuration mode. If needed, the device configuration detection block 132 may, periodically or in response to a detected change in the field device condition, send a signal to the field device 125 inquiring as to the configuration state of the field device 125 to thereby cause the field device 125 to respond with a signal indicating the configuration state of the field device 125.

Upon detecting a change in the configuration condition or state of the field device 125 from a normal operating configuration state to a non-normal operating configuration state, the device configuration detection block 132 sends a signal to a bypass/override logic block 134 which uses any desired or appropriate logic to initiate a bypass or an override (associated with the field device 125) and to provide such a bypass or override signal to the voter function block 127. For example, upon detecting that the field device 125 has been placed into a testing mode by, for example, being placed into a fixed current mode, the override/bypass logic 134 may automatically generate a bypass or an override for use in the voter function block 127 to prevent the voter function block 127 from using the output signal from the field device 125 in detecting a event within the process plant. In a similar manner, upon detecting that the field device 125 has been placed into a normal operating mode from a testing or calibration mode (e.g., a non-normal operating configuration state), the override/bypass logic 134 may automatically remove a bypass or an override that has previously been sent to the voter function block 127 to thereby cause the voter function block 127 to again use the output signal from the field device 125 (i.e., the IN1 signal) to detect events within the process plant.

In this manner, the input function block 120 includes logic that automatically coordinates the use of bypasses and overrides with changes in the field device configuration, even when changes to the field device configuration are made by an external device without other coordination with the safety system logic. As a result of this coordination, the safety system will automatically bypass or override inputs from a field device when that field device has been placed into a testing, calibration or other non-normal operating state by any user or source. Conversely, the safety system will automatically remove the override or bypass when a field device is placed from a testing, calibration or other non-normal operating configuration state to the normal operating state, thereby coordinating the state of the field device with the overrides and bypasses used in the safety system.

While the override/bypass logic 134 is described as removing overrides or bypasses when the field device is detected as being returned to a normal operating state, the override/bypass logic 134 could instead or in addition employ the automatic removal of the overrides or bypasses based on timers, such as those described above with respect to the voter function block 94 of FIG. 2. Thus, the override/bypass logic 134 could include logic that, when a timer times out after the initiation of a bypass or an override, automatically removes that bypass or override, notifies a user of the expired time or soon to be expired time or takes any of the other actions described above with respect to the removal of overrides or bypasses within the voter function block 94.

Additionally, the safety system may further coordinate testing of a field device by being able to place the field device 125 into a testing, calibration or other non-normal operating state from the normal operating state without manual assistance by a user or operator, even when the field device 125 is in a write protected state. In particular, the input function block 120 may include a device configuration control block 140 that has access to a set of commands 142 that can be sent to the field device 125 to change the configuration setting of the field device 125 even when the field device 125 is in a write protected state. If desired, the device configuration control block 140 may be responsive to signals provided from other logic within the logic solver, i.e., the SIS logic 129, to initiate a change in the field device configuration to thereby enable the logic 129 to run the field device through a testing procedure, a calibration procedure, etc. as part of the safety system logic.

The commands 142 may be a sub-set of commands specifically configured to cause the field device 125 to undergo a configuration change, such as from a normal operating mode to a fixed current testing mode, etc. even though the field device 125 is write protected. Such a set of commands would generally need to be added to the set of commands recognized by the field device 125 and, thus, the field device 125 would need to be programmed to activate these configuration changes based on the receipt of one or more valid signals from the device configuration control block 140 within, for example, the safety logic system. Such a set of commands may include the Command 35 of the HART protocol which is a "write range values" command that could be used to reconfigure a HART device. Of course, other write commands from the HART or other protocols could be used as well.

In the example illustrated in FIG. 5, the field device 125 includes a typical communication stack 150 that provides communication to and from the field device 125 using any desired or known communication protocol. The field device 125 also includes configuration control software that controls the configuration state of the field device 125. Such configuration control software may be standard configuration control software as used in known field devices that use a write protection parameter 154 to control whether to make requested configuration changes. However, the configuration control software 152 may be programmed to recognize a set of commands 142 from a trusted source, such as from a known logic or process controller, and to initiate changes to the configuration of the field device 125 upon a valid receipt of one of these commands while the write protection parameter 154 is still set to a protected state. In this manner, a logic controller or a process controller or other trusted source may be able to make changes to the configuration of the field device 125 without having to change the write protection parameter 154 to an unprotected state (which would also enable other configuration changes to be made from other unauthorized sources) and without having to force the field device through a power cycle. If desired, the commands 142 may include a command to make a configuration change, such as from a normal operating state to a testing or calibration state, or vice versa and may include a designation of the source of the command, i.e., the device that is sending the command. The field device 125 may also be programmed to initiate the configuration change specified by one of the commands 142 (whether or not the write protection feature of the field device 125 is set) only if the command 142 comes from or originates from a particular source (such as a function block) or a device. In this manner, the commands 142 may be sent by a trusted source to cause configuration changes in the field device even when the field device 125 is write protected, as defined by the protection variable 154.

In any event, using the new set of commands, the logic solver can make configuration changes to the field device 125 to cause the field device 125 to enter or leave a testing or calibration mode. These new commands may incorporate a write check mechanism, as required by IEC 61511, but cause the field device to enter a fixed current mode or a calibration mode and can be sent and initiated when the field device 125 is still configured to be write protected. However, the new commands do not need to be protected by the write protection mechanism 154 of the field device 125 because they are initiated by a known and trusted source, i.e., the safety logic system. As a result of these commands, the safety logic system can coordinate the necessary maintenance functions for the field device 125 in a secure manner without exposing the field device 125 to other undesirable configuration changes.

If desired, as part of this process, either or both the device configuration control block 140 of the input function block 120, and/or the field device 125 can include logs 160 and 162 that store or log the messages and configuration changes made by the device configuration control block 140 and the responses to these messages made by the field device 125. Of course, these logs can be configured in any standard, known or desired manner. In this manner, the safety system and the field device 125 can store a record of the commands and responses sent between the field device 125 and the logic solver of the safety system to provide a complete log of actions taken on the field device 125, even when the field device 125 is otherwise write protected.

If desired, and as noted above, the sub-set of commands 142 may only be initiated from the logic solver, such as from the device configuration control block 140 of FIG. 5, to assure that only a trusted source, e.g., the logic solver within the safety system 14, is able to use these commands to make configuration changes, even though the field device 125 may be manipulated by other sources, such as by the hand-held configuration device 85 of FIG. 1, once placed into a testing, calibration or other non-normal operating mode. Still further, if desired, the field device 125 may be set up so that it can only be configured or have a change made to its configuration by the logic solver to thereby assure that any configuration changes made to the field device 125 are coordinated with the operation of the safety system 14.

While the input function block for providing coordination between the field device and the logic solver is described in detail as an AI function block, any type of function block, such as an AI, DI, voter or other input function block may be programmed to provide this functionality. Thus, while the device configuration control logic 140 and the device configuration detection logic 132 is illustrated and described as being provided within an input function block, this logic could instead or in addition be placed in other function blocks, including in stand-alone function blocks associated with the logic in the logic solver. Moreover, while described as being tied to and used in the logic solver, the device configuration detection and control blocks 132 and 140 described herein could be used in other types of control blocks or routines, such as those implemented in performing traditional process control functions, like the control software within the controllers 24 and 26 of FIG. 1 or in any other devices that perform control activities. Still further, while the input function block 120 of FIG. 5 has been described as providing bypass or override signals to a voter function block 127 in a safety logic system, the input function block 120 could instead or in addition, provide such override or bypass signals to other elements within a safety system (or a process control system) to cause other types of bypasses or overrides of other functionality associated with those systems. Thus, the explanation of voter function block override and bypass features provided above is intended only as an example of one manner in which the automatically generated bypass or override signals may be used, and is not considered to be the only manner of using these bypass or override signals.

While described in an example using the HART communication protocol, the device configuration detection and control logic described herein could be used with any other desired communication and device protocols, such as the Fieldbus, Profibus, CAN, etc. protocols. Additionally, this logic may be used in the Foundation Fieldbus protocol or in any other system wherein the safety functions are or may be deployed completely in the field devices. Thus, while illustrated as being in a separate device from the field device being controlled, the device detection and configuration logic described herein may be implemented in the field device itself.

While FIG. 1, indicates that the safety logic system 14 uses voter function blocks that receive inputs from AI, DI or other input function blocks, the system logic system 14 may use inputs from any other types of function blocks or may have inputs generated as other types of signals within the process plant 10. For example, and as will be understood, framework support could be provided at a level above the communication stack in the safety system for reading input/output values and device state/status/mode signals and for peeking at any other commands or messages being sent between devices to enable the detection of a configuration change in a device. This framework could also be used in other control languages, such as ladder logic, sequential function chart, state transition, and custom function block languages, to name but a few, by observing or reading signals indicative of state changes, or other operations within these languages indicating a configuration change or other change within the system which might lead to the initiation or de-initiation of a bypass or an override within the safety system.

Still further, while the outputs of the voter function blocks 92 and 94 FIG. 1 have been illustrated as being connected to output function blocks such as AO, DO or other function blocks such as a cause and effect function block or a control routine, these outputs can be connected to any other desired type of function blocks, such as sequencer function blocks, staging function blocks, etc., associated with the safety logic system 14 or even directly to other applications or programming environments within the process plant 10. Likewise, while the logic described herein has been effected using a function block programming paradigm, the same logic can be provided in other types of programming environments and still be considered as a function block as used herein. Thus, while the function blocks described herein are described for use in a safety system of a process plant or process control environment, these or similar function blocks could be used in a standard process control environment or for other desired uses other than use in a safety system.

When implemented, any of the elements described herein, including the input blocks, voter blocks, inhibit blocks, voter logic blocks, device configuration and detection blocks, signal connections, etc. may be implemented in software stored in any computer readable memory such as on a magnetic disk, a laser or optical disk, or other storage medium, in a RAM or ROM of a computer or processor, etc. Signals and signal lines described herein can take any form, including actual wires, data registers, memory locations, etc. The software described herein may take any form, including application software executed on a general purpose computer or processor or hard coded software burned into, for example, an application specific integrated circuit (ASIC), an EPROM, EEPROM, or any other firmware device. Likewise, this software may be delivered to a user, a process plant, an operator workstation, a controller, a logic solver or any other computing device using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and or encryption technique before being transmitted over a communication channel.

Of course, the function blocks described herein can be implemented using any external process control communication protocol (besides a Fieldbus protocol or a DeltaV protocol) and may be used to communicate with any type of function block including any function block that is similar to or the same as any of the different function blocks specifically identified by or supported by the Fieldbus protocol. Moreover, while the input and voter function blocks in one embodiment hereof may be Fieldbus "function blocks," it is noted that the use of the expression "function block" herein is not limited to what the Fieldbus protocol identifies as a function block but, instead, includes any other type of block, program, hardware, firmware, etc., entity associated with any type of control system and/or communication protocol that can be used to implement some process control routine functionality or that has a predefined setup or protocol for providing information or data to other such function blocks. Thus, while function blocks typically take the form of objects within an object oriented programming environment, this need not be case and can, instead, be other logical units used to perform particular control (including input and output) functions within a process plant or control environment using any desired programming structure or paradigm.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A function block entity for use in a process environment having a processor communicatively coupled to control one or more field devices, at least one of which is configurable to be set into a plurality of different configuration states including a normal operating configuration state and at least one non-normal operating configuration state, the function block entity comprising:
   a computer readable medium; and
   a function block stored on the computer readable medium and adapted to be executed on the processor, the function block including;
   an input adapted to receive an input signal from within the process environment indicating a configuration state of at least one of the field devices;
   a detection unit coupled to the input that detects when the at least one of the field devices is in a non-normal operating configuration state; and
   inhibit logic that automatically produces an inhibit signal when the at least one of the field devices is in a non-normal operating configuration state to inhibit the use of a further signal from the at least one of the field devices.

2. The function block entity of claim 1, wherein the inhibit logic produces a bypass signal for bypassing the use of the further signal from the at least one of the field devices.

3. The function block entity of claim 1, wherein the inhibit logic produces an override signal for overriding a decision made using the further signal from the at least one of the field devices.

4. The function block entity of claim 1, wherein the function block includes a second input for receiving the further signal from the at least one of the field devices.

5. The function block entity of claim 1, wherein the detection unit further detects when the at least one of the field devices enters into the normal operating configuration state from the non-normal operating configuration state based the input signal from the at least one of the field devices and wherein the inhibit logic automatically removes the inhibit signal when the at least one of the field devices is in the normal operating configuration state to allow the use of the further signal from the at least one of the field devices.

6. The function block entity of claim 1, wherein the at least one of the field devices includes a write protection variable the state of which generally controls when the at least one of the field devices can be switched between the normal operating configuration state and a non-normal operating configuration state and wherein the function block further includes a memory that stores a configuration change command adapted to cause the at least one of the field devices to transition between the normal operating configuration state and a non-normal operating configuration state when the write protection variable is in a state that generally prohibits the at least one of the field devices from being switched between the normal operating configuration state and the non-normal operating configuration state and wherein the function block includes a command transmitter that transmits the configuration change command to the at least one of the field devices to cause the at least one of the field devices to undergo a configuration change without resetting the write protection variable.

7. The function block entity of claim 6, wherein the function block includes a log indicating when the function block sent the configuration change command to the at least one of the field devices.

8. The function block entity of claim 7, wherein the function block includes another log indicating when the at least one of the field devices responded to the configuration change command received from the function block.

9. The function block entity of claim 1, wherein the input is adapted to receive an input signal conforming to the HART communication protocol.

10. The function block of claim 1, wherein the inhibit logic is adapted to automatically remove the inhibit signal after a predetermined amount of time.

11. The function block of claim 10, further including notify logic that notifies a user that the inhibit signal has been initiated for a second predetermined amount of time.

12. The function block of claim 10, further including notify logic that notifies a user that the inhibit signal will be removed after the predetermined amount of time prior to the inhibit logic removing the inhibit signal.

13. The function block of claim 1, further including notify logic that notifies a user that the inhibit signal has been initiated for a predetermined amount of time.

14. A process control system for use in a process environment, comprising:
   a field device that is configurable to be set into a plurality of different configuration states including a normal operating configuration state and a non-normal operating configuration state, wherein the field device produces a process related signal;
   a communication link; and
   a controller coupled to the field device through the communication link and adapted to perform a control activity within the process environment using the process related signal, the controller including;
   a processor;
   a signal receiver unit adapted to be executed on the processor to receive one or more signals from the field device through the communication link;
   a detection unit adapted to detect when the field device is in the non-normal operating configuration state based on the one or more of the signals from the field device; and
   an inhibit unit that automatically produces an inhibit signal when the field device is in the non-normal operating configuration state to inhibit the use of the process related signal from the field device by the controller in performing the control activity in the process environment.

15. The process control system of claim 14, wherein the detection unit is further adapted to detect when the field device enters into the normal operating configuration state from the non-normal operating configuration state based on the one or more of the signals from the field device and wherein the inhibit unit automatically removes the inhibit signal when the field device is in the normal operating configuration state to enable the use of the process related signal from the field device by the controller.

16. The process control system of claim 14, wherein the field device is a sensor.

17. The process control system of claim 14, wherein the field device is a valve controlled by the controller.

18. The process control system of claim 14, wherein the controller is a safety system controller that uses the process related signal to initiate a shut-down procedure within the process environment.

19. The process control system of claim 14, wherein the field device includes a write protection variable the state of which generally controls when the field device can be switched between the normal operating configuration state and the non-normal operating configuration state and wherein the controller further includes a field device configuration unit that stores a configuration change command adapted to cause the field device to transition between the normal operating configuration state and the non-normal operating configuration state when the write protection variable is in a state that generally prohibits the field device from being switched between the normal operating configuration state and the non-normal operating configuration state.

20. The process control system of claim 19, wherein the controller or the field device includes a log that logs when the controller sends the configuration change command to the field device.

21. The process control system of claim 19, wherein the controller or the field device includes a log that logs when the field device changes between one of the normal operating configuration state and the non-normal operating configuration state and the other of the normal operating configuration state and the non-normal operating configuration state.

22. The process control system of claim 19, wherein the controller further includes logic that sends a signal to the field device configuration unit to cause the field device configuration unit to cause the field device to undergo a configuration state change.

23. The process control system of claim 14, wherein the non-normal operating configuration state of the field device is a fixed current mode.

24. The process control system of claim 23, wherein the field device conforms to the HART protocol.

25. The process control system of claim 14, wherein the inhibit unit is adapted to remove the inhibit signal after a predetermined amount of time.

26. The process control system of claim 25, further including notify logic that notifies a user that the inhibit signal has been initiated for a second predetermined amount of time.

27. The process control system of claim 25, further including notify logic that notifies a user that the inhibit signal will be removed after the predetermined amount of time prior to the inhibit unit removing the inhibit signal.

28. The process control system of claim 14, further including notify logic that notifies a user that the inhibit signal has been initiated for a predetermined amount of time.

29. A control system for use in a process environment having a field device that is configurable to be set into a plurality of different configuration states including a normal operating configuration state and a non-normal operating configuration state and a communication link connected to the field device, the control system comprising:
   a memory;
   a processor;

a first control routine stored on the memory and adapted to be executed on the processor to use -a first signal from the field device to perform a process control function within the process environment; and a second routine including;

an input adapted to receive a second signal indicative of the configuration state of the field device from the field device through the communication link;

a detection unit adapted to detect when the field device is in the non-normal operating configuration state based on the second signal; and an inhibit unit that automatically produces an inhibit signal when the field device is in the non-normal operating configuration state and that provides the inhibit signal to the first control routine to inhibit the use of the first signal from the field device by the first control routine.

30. The control system of claim 29, wherein the second routine is stored on the memory and is adapted to be executed on the processor.

31. The control system of claim 29, further including a second memory and a second processor and wherein the second routine is stored on the second memory and is adapted to be executed on the second processor.

32. The control system of claim 29, wherein the detection unit is further adapted to detect when the field device enters into the normal operating configuration state from the non-normal operating configuration state based on the second signal from the field device and wherein the inhibit unit is adapted to automatically remove the inhibit signal from the first control routine when the field device is in the normal operating configuration state to enable the use of the first signal from the field device by the first control routine.

33. The control system of claim 32, wherein the first control routine is a safety system control routine that uses the first signal from the field device to initiate a shut-down procedure within the process environment.

34. The control system of claim 29, wherein the inhibit unit produces a bypass signal as the inhibit signal that causes the first control routine to not use the first signal from the field device in assessing whether to perform the process control function.

35. The control system of claim 29, wherein the inhibit unit produces an override signal as the inhibit signal that causes the first control routine to not perform the process control function when logic within the control routine that uses the first signal to decide whether to perform the process control function indicates that the process control function should be performed.

36. The control system of claim 29, wherein the field device includes a write protection variable the state of which generally controls when the field device can be switched between the normal operating configuration state and the non-normal operating configuration state and wherein the control system further includes a third routine that stores a configuration change command adapted to cause the field device to transition between the normal operating configuration state and the non-normal operating configuration state when the write protection variable is in a state that generally prohibits the field device from being switched between the normal operating configuration state and the non-normal operating configuration state and a signal transmitter that transmits the configuration change command to the field device.

37. The control system of claim 36, wherein the third routine is communicatively connected to the first control routine and is adapted to transmit the configuration change command to the field device in response to a control signal from the first control routine.

38. The control system of claim 36, wherein the third routine includes a log that logs when the third routine sends the configuration change command to the field device.

39. The control system of claim 36, wherein the second routine includes a log that logs when the field device changes between one of the normal operating configuration state and the non-normal operating configuration state and the other of the normal operating configuration state and the non-normal operating configuration state in response to the third routine sending the configuration change command to the field device.

40. The control system of claim 29, wherein the inhibit unit is adapted to automatically remove the inhibit signal after a predetermined amount of time.

41. The control system of claim 40, further including a clock that determines the predetermined amount of time.

42. The control system of claim 40, further including notify logic that notifies a user that the inhibit signal will be removed after the predetermined amount of time prior to the inhibit unit removing the inhibit signal.

43. The control system of claim 42, wherein the inhibit unit enables a user to increase the predetermined amount of time prior to the inhibit unit removing the inhibit signal.

44. The control system of claim 29, further including notify logic that notifies a user that the inhibit signal has been initiated for a predetermined amount of time.

45. A method for use in a controller of a process environment to coordinate logic within the controller with a field device, wherein the field device is connected to the controller via a communication link and is configurable to be set into a plurality of different configuration states including a normal operating configuration state and a non-normal operating configuration state, the method comprising:

receiving a first signal from the field device and using the first signal to perform a control function with respect to the process environment;

receiving a second signal from the field device through the communication link indicative of a configuration state of the field device;

detecting when the field device is in the non-normal operating configuration state based on the second signal from the field device; and automatically inhibiting the use of the first signal in performing the control function when the field device is in the non-normal operating configuration state.

46. The method of claim 45, wherein detecting further includes detecting when the field device enters into the normal operating configuration state from the non-normal operating configuration state based the second signal from the field device and wherein automatically inhibiting includes automatically allowing the use of the first signal in performing the control function when the field device is in the normal operating configuration state.

47. The method of claim 45, wherein the control function is a safety system control function that uses the first signal from the field device to initiate a shut-down procedure within the process environment.

48. The method of claim 45, wherein the field device includes a write protection variable the state of which generally controls when the field device can be switched between the normal operating configuration state and the non-normal operating configuration state and wherein the method further includes storing a configuration change command adapted to cause the field device to transition between the normal operating configuration state and the non-normal operating configuration state when the write protection variable is in a state that generally prohibits the field device from being switched between the normal operating configuration state and the non-normal operating configuration state and sending the configuration change command to the field device to cause the field device to undergo a configuration change without resetting the write protection variable.

49. The method of claim 48, further including storing a log indicating when the controller sent the configuration change command to the field device.

50. The method of claim 48, further including storing a log indicating when the field device responded to the configuration change command received from the controller.

51. The method of claim 45, wherein automatically inhibiting the use of the first signal in performing the control function includes creating a bypass signal that causes logic used to decide whether to perform the control function to not use the first signal in assessing whether to perform the control function.

52. The method of claim 45, wherein automatically inhibiting the use of the first signal in performing the control function includes creating an inhibit signal that causes logic used to perform the control function to not perform the control function when logic that uses the first signal to decide whether to perform the control function indicates that the control function should be performed.

53. The method of claim 45, wherein automatically inhibiting includes automatically allowing the use of the first signal in performing the control function after a predetermined amount of time.

54. The method of claim 53, wherein automatically inhibiting includes using a clock to determine the predetermined amount of time.

55. The method of claim 53, wherein automatically inhibiting includes notifying a user that the first signal will be allowed to perform the control function after the predetermined amount of time prior to automatically allowing the use of the first signal to perform the control function after the predetermined amount of time.

56. The method of claim 55, wherein automatically inhibiting includes enabling a user to increase the predetermined amount of time prior to automatically allowing the use of the first signal to perform the control function after the predetermined amount of time.

57. The method of claim 45, wherein automatically inhibiting includes notifying a user that the first signal has been prevented from being used to perform the control function after a predetermined amount of time.

* * * * *

UNITED STATES PATENT AND TRADEMARK OFFICE
CERTIFICATE OF CORRECTION

PATENT NO. : 7,010,450 B2
APPLICATION NO. : 10/668013
DATED : March 7, 2006
INVENTOR(S) : Gary K. Law et al.

Page 1 of 1

It is certified that error appears in the above-identified patent and that said Letters Patent is hereby corrected as shown below:

On Title Page

Item (56), Foreign Patent Documents, please add -- GB-2 274 929, 8/1994 --.

Item (56), Foreign Patent Documents, please add -- EA-1 091 199, 4/2001 --.

Item (56), Foreign Patent Documents, please add -- WO-00/38040, 6/2000 --.

Item (56), Foreign Patent Documents, please add -- WO-03-098172, 11/2003 --.

At Column 3, line 10, "testing" should be -- tested --.

At Column 11, line 2, "block" should be -- blocks --.

At Column 13, line 26, "2oo2" should be -- 1oo2 --.

At Column 14, line 35, "in" should be -- an --.

At Column 15, line 46, "such" should be -- such as --.

At Column 16, line 40, "and" should be -- an --.

At Column 25, line 2, "-a" should be -- a --.

Signed and Sealed this

Sixth Day of March, 2007

JON W. DUDAS
*Director of the United States Patent and Trademark Office*